BEST AVAILABLE COPY
L. Burnell
Rotary Pump.
No. 211. A.I. Patented Dec. 14, 1858.
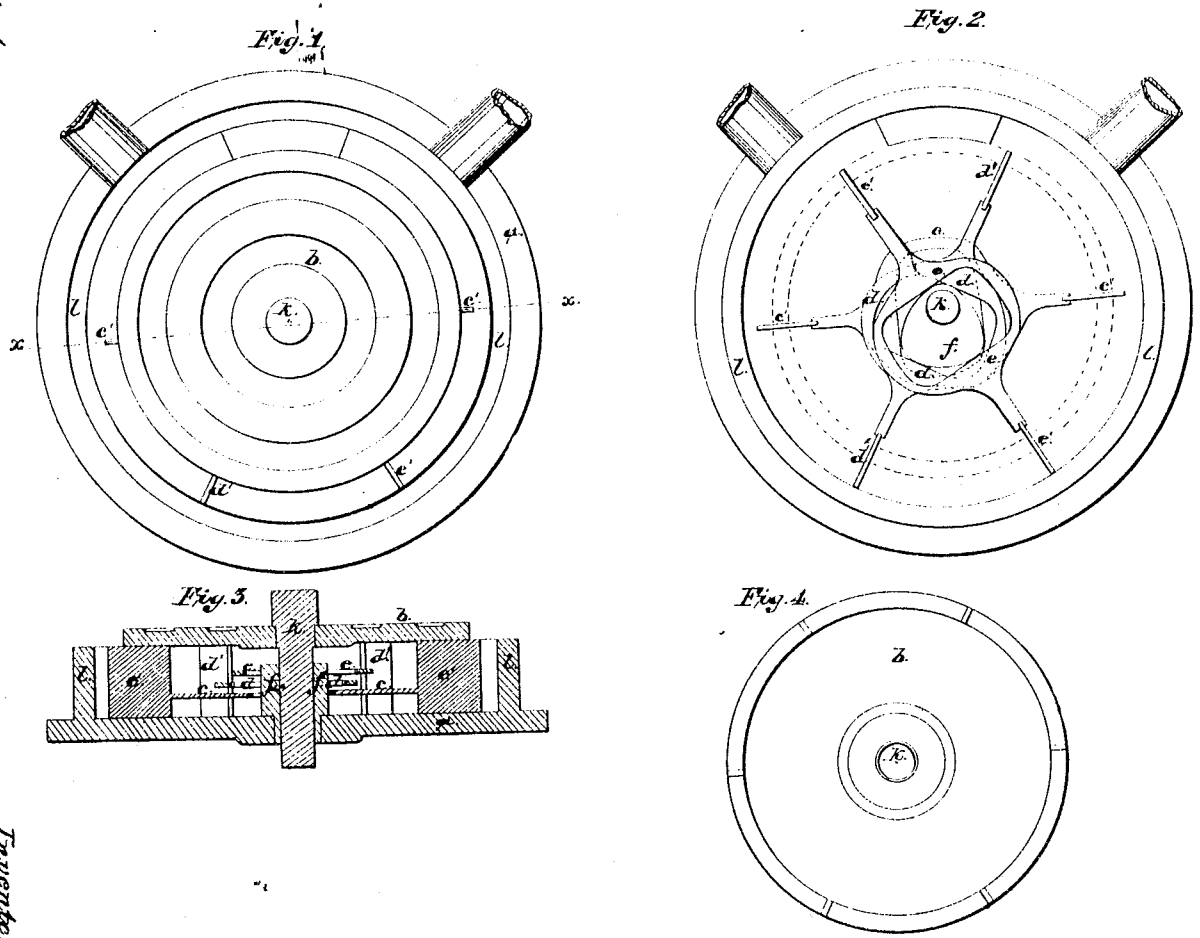
Attest:
Z C Robbins
J Quincy Adams
Inventor:
Lan Burnell
N. PETERS, PHOTO-LITHOGRAPHER, WASHINGTON, D. C.